(12) United States Patent
Vasquez et al.

(10) Patent No.: US 8,925,243 B1
(45) Date of Patent: Jan. 6, 2015

(54) DEVICE FOR CAPTURING INSECTS OR PESTS

(76) Inventors: Robert I. Vasquez, Gilbert, AZ (US); Brian R. Freeland, Chandler, AZ (US)

( * ) Notice: Subject to any disclaimer, the term of this patent is extended or adjusted under 35 U.S.C. 154(b) by 526 days.

(21) Appl. No.: 12/642,779

(22) Filed: Dec. 19, 2009

Related U.S. Application Data

(60) Provisional application No. 61/139,556, filed on Dec. 20, 2008, provisional application No. 61/167,809, filed on Apr. 8, 2009.

(51) Int. Cl.
*A01M 3/00* (2006.01)
*A01M 3/04* (2006.01)

(52) U.S. Cl.
USPC .............................. 43/136; 43/132.1; 43/133

(58) Field of Classification Search
USPC .................... 43/124, 132.1, 133, 135, 136
See application file for complete search history.

(56) References Cited

U.S. PATENT DOCUMENTS

| | | | | |
|---|---|---|---|---|
| 1,190,165 | A * | 7/1916 | Hemenway et al. | 43/136 |
| 1,623,006 | A * | 3/1927 | Hamborg et al. | 43/136 |
| 2,545,215 | A * | 3/1951 | Sharpe | 43/137 |
| 3,191,339 | A * | 6/1965 | Dougherty | 43/137 |
| 4,052,811 | A | 10/1977 | Shuter et al. | |
| 4,450,649 | A | 5/1984 | Dunwody | |
| 4,759,150 | A * | 7/1988 | Pierce | 43/136 |
| 4,787,171 | A | 11/1988 | Dahenais | |
| 4,791,150 | A | 12/1988 | Braden et al. | |
| 4,974,360 | A * | 12/1990 | Davis | 43/135 |
| 5,029,411 | A * | 7/1991 | Keenan | 43/136 |
| 5,058,314 | A * | 10/1991 | Frascone | 43/136 |
| 5,365,690 | A * | 11/1994 | Nelson et al. | 43/113 |
| 5,537,777 | A | 7/1996 | Geeting | |
| 5,634,293 | A * | 6/1997 | Mike et al. | 43/136 |
| 5,651,211 | A * | 7/1997 | Regan et al. | 43/113 |
| 6,044,584 | A | 4/2000 | Lynn | |
| 6,067,746 | A | 5/2000 | Kistner et al. | |
| 6,185,862 | B1 | 2/2001 | Nelson | |
| 6,279,262 | B1 * | 8/2001 | Walkemeyer | 43/134 |
| 6,564,505 | B1 * | 5/2003 | Anderson | 43/136 |
| 6,908,216 | B2 * | 6/2005 | Love | 362/253 |
| 7,004,520 | B2 | 2/2006 | Khubani | |
| 7,065,919 | B1 | 6/2006 | Vierra | |
| 7,165,355 | B2 | 1/2007 | George et al. | |

(Continued)

FOREIGN PATENT DOCUMENTS

| JP | 10-84836 | * | 4/1998 |
|---|---|---|---|
| JP | 2000-316451 | * | 11/2000 |
| JP | 2009-225747 | * | 10/2009 |

*Primary Examiner* — David Parsley
(74) *Attorney, Agent, or Firm* — Paul B. Heynssens Attorney at Law PLC

(57) ABSTRACT

The present example provides a device for capturing insects from a distance with adhesive pads. After capture disposal is facilitated by enveloping the insect/arachnid in the adhesive pad. The device keeps the insect/arachnid at a distance from the user, and allows an expanded reach during capture. The design also allows for disposal of the insect/arachnid while keeping the user at a distance from the insect/arachnid. The device may also include an illumination source such as a flashlight or black light for illuminating the targeted insect/arachnid. The adhesive pads are easily coupled to the device, and held in place during use. A unique jaw design for supporting the adhesive pad facilitates capture and manipulation of the pad during disposal of the insect/arachnid. Finally, the device may also be used without the adhesive pads if desired. Such pad-less operation may also keep the user at a distance from the insect/arachnid.

4 Claims, 16 Drawing Sheets

(56) References Cited

U.S. PATENT DOCUMENTS

| | | |
|---|---|---|
| 7,469,501 B1 | 12/2008 | Blum |
| 2002/1017864 | 12/2002 | Betzen |
| 2006/0032112 A1 | 2/2006 | George et al. |
| 2006/0185224 A1 | 8/2006 | Klein |
| 2007/0101639 A1 | 5/2007 | Huang |
| 2007/0271839 A1 | 11/2007 | Su |
| 2008/0040967 A1 | 2/2008 | Young |
| 2009/0100745 A1 * | 4/2009 | Knight ............................ 43/135 |

* cited by examiner

DEVICE FOR CAPTURING INSECTS OR PESTS

CROSS-REFERENCE TO RELATED APPLICATIONS

This application claims the benefit of U.S. Provisional Patent Application No. 61/139,556 filed Dec. 20, 2008, and U.S. Provisional Patent Application No. 61/167,809 filed Apr. 8, 2009 the contents of which are hereby incorporated by reference.

TECHNICAL FIELD

This description relates generally to extendable reaching devices and more specifically to extendable devices for capturing insects, arachnids and the like.

BACKGROUND

Unwanted insects and arachnids ("bugs") can be a nuisance to homeowners. They can cause damage to belongings and foodstuffs. Further, they can be harmful to humans by causing stings or bites. In addition, some varieties such as bees, scorpions and spiders can be venomous. Others, such as mosquitoes and flies can carry and spread disease.

Unfortunately, their small size makes them difficult to eliminate from the home. Insects may crawl or fly into the home through open windows or doors. They may also enter through cracks, crevices, and drains. Once in the home they may be difficult to capture due to their size, and their propensity is to hide in inaccessible places that are often dimly lit. Once discovered they often retreat to inaccessible areas when pursued. Devices such as flyswatters and the like often require enough room to swing the device in order to kill the bug. Chemical methods such as bug spray may be undesirable to homeowners wishing to reduce exposure to harmful chemicals. In particular, the homeowner may wish to reduce chemical exposure suffered by children, pets, and livestock.

Some people may wish to kill or capture an insect/arachnid without using a shoe or otherwise getting too close to it, or touching it. Many people have intense fear of roaches, spiders and scorpions. This is not an unjustified concern, as many insect/arachnids such as scorpions and spiders may be venomous. Many people would prefer to have the ability to capture or kill and dispose of an insect/arachnid from a distance that feels comfortable or safe. Typically the farther the distance in capturing and disposing of the insect/arachnid the better they will feel. For example, if one tries to kill scorpions or spiders with their shoe, they may not feel safe knowing that if they missed hitting the insect/arachnid that the insect/arachnid might crawl towards them quickly and try to attack or sting them. Thus a device free of harmful chemicals that can capture an insect/arachnid, is capable of reaching inaccessible areas, keeps the insect/arachnid away from the user, and allows clean disposal, of the insect/arachnid may be desirable to consumers.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a device for capturing insects from a distance with adhesive pads. After capture disposal is facilitated by enveloping the insect/arachnid in the adhesive pad. The device for capturing insects from a distance with adhesive pads keeps the insect/arachnid at a distance from the user, and allows an expanded reach during capture. The design also allows for disposal of the insect/arachnid while keeping the user at a distance from the insect/arachnid. The device for capturing insects from a distance with adhesive pads may also include an illumination source such as a flashlight, or black light, for illuminating the targeted insect/arachnid. The adhesive pads are easily coupled to the device, and held in place during use. A unique jaw design for supporting the adhesive pad facilitates capture and manipulation of the pad during disposal of the insect/arachnid. Finally, the device for capturing insects from a distance with adhesive pads may also be used without the adhesive pads, if desired, to smash, capture and dispose the insect/arachnid all from a safe distance. Such pad-less operation is possible because of the unique design of the jaws functioning as a smash device while the jaws are in their normal closed position and further as a reach device to pickup and dispose of the insect with the operation of opening and closing the jaws.

Many of the attendant features will be more readily appreciated, as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
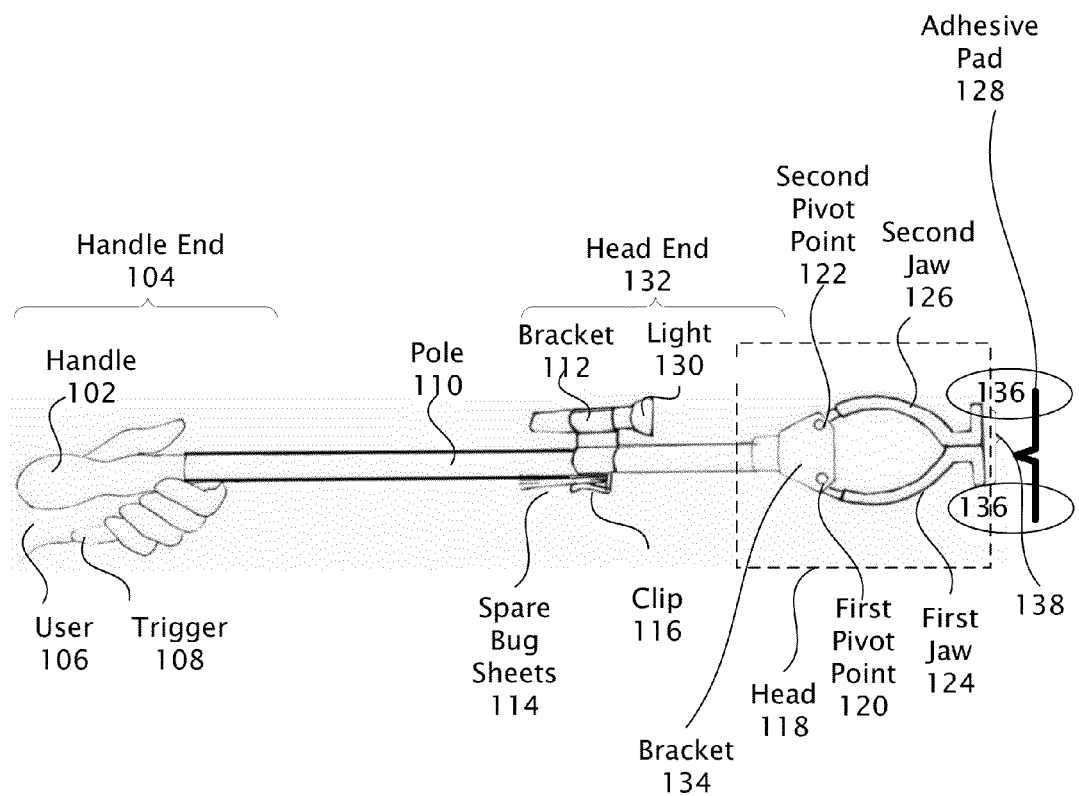
FIG. 1 shows an example of a device for capturing insects from a distance with adhesive pads.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe an insect and/or arachnid-capturing device for capturing and disposing of insects/arachnids from a distance with adhesive pads. Although the present examples are described and illustrated herein as being implemented in an insect/arachnid capture and disposal system, the system described is provided as an example and not a limitation. As those skilled in the art will appreciate, the present examples are suitable for application in a variety of different types of reaching and holding systems. For example, the device for capturing insects from a distance with adhesive pads may be modified for use by those with impaired mobility to retrieve small objects and dispose of them or otherwise reclaim them. Likewise, the device for capturing insects from a distance with adhesive pads may be provided with modified jaws to reach and retrieve objects from the floors, cupboards, closets and the like.

The terms pest, bug and the term insect are all understood to include insects, arachnids, rodents and the like. Typically, a bug or pest is defined here to include any small creature of a size that the device for capturing insects from a distance with adhesive pads may be used to capture and/or dispose of. In equivalent alternative examples, a larger pad may be substituted, with the same or stronger adhesive for capturing larger pests such as rodents, lizards, and other small animals. Alternatively, the adhesive pads of any size may be used to pick up objects as well. Thus in the examples described below, it is understood that when the term insect/arachnid, or bug is used, that small animal, lizard, rodent, rat, mouse, object or the like may be substituted for insect/arachnid to describe alternative examples. The use of the term insect/arachnid describes but one example and is not intended to be limiting.

The present example provides a device for capturing insects from a distance with adhesive pads. After capture, disposal is facilitated by enveloping the insect/arachnid in the adhesive pad. The device for capturing insects from a distance with adhesive pads keeps the insect/arachnid at a distance from the user, and allows an expanded reach during capture. The design also allows for disposal of the insect/arachnid while keeping the user at a distance from the insect/arachnid. The device for capturing insects from a distance with adhesive pads may also include an illumination source such as a flashlight or black light for illuminating the targeted insect/arachnid. The adhesive pads are easily coupled to the device, and held in place during use. A unique jaw design for supporting the adhesive pad facilitates capture and manipulation of the pad during disposal of the insect/arachnid. The device for capturing insects from a distance with adhesive pads may also be used without the adhesive pads if desired. Such padless operation may also keep the user at a distance from the insect/arachnid. The adhesive pads may also be used without the pole, as the pads may be sold separately from the unit as replacements, as such they may also be purchased for individual use. The device can also be used for rodents, and other small animals when provided with larger sized adhesive pads, or even without pads at all but rather just using the unique jaws to attack and capture the small animal.

FIG. 1 shows an example of a device for capturing insects from a distance with adhesive pads 100. An exemplary device for capturing insects from a distance with adhesive pads 100 may include a short rod/pole 110 (approximately 12 to 36 inches) with a jaw assembly 118 at one end that is used for capturing and disposing of bugs (including insects, arachnids, and the like) with or without the aid of an adhesive sheet assembly. The examples of the invention may take many different forms, but all may include a structure in which a disposable adhesive assembly, or pads, may be used to capture the insect/arachnid and then the device for capturing insects from a distance with adhesive pads may then eject the folded adhesive pad including the captured bug for disposal.

A user can capture and dispose of the insect/arachnid from an exemplary three-foot distance, by using a trigger 108 and the rod/pole 110. The rod/pole 110 may provide two benefits. The first is that the user can be three feet away from the undesirable insect/arachnid and can capture and dispose of the insect/arachnid from this safe distance. The second is that the rod or pole gives the user the advantage of a three-foot reach in order to capture insects on walls/ceilings or even behind furniture where the user would have difficulty in capturing the insect/arachnid without the reach. Another, advantage is that the invention does not use any pesticides or poisons to attract or kill the insects and as a by-product potentially harm the consumer or their pets.

The device for capturing insects from a distance with adhesive pads 100 includes a pole 110, having a handle end 104, and a head end 132. A handle 102 is coupled to the handle end 104 of pole 110. A head 118 is coupled to the head end 132 of pole 110. The pole 110 may also include a trigger or suitable actuation device 108, typically disposed at the handle end 104. The pole 110 may also include a light 130 coupled to the pole 110 by bracket 112. The bracket 112 may include a clip 116 for storing spare adhesive pads 114. The light 130 may be a conventional light source, such as a flashlight. Alternatively, the light 130 may be a black light.

The head 118 may include a bracket 134 coupled to the pole 110. Coupling to the pole 110 may be by any conventional method, including brackets, an aperture for accepting the pole, or the like. Further, coupling of the pole 110 to the head 118 may be secured by screws, pins, glue or the like. The bracket 134 may include a first pivot point 120, and a second pivot point 122, which couple a first jaw 124, and a second jaw 126 to the head 118. The head 118 may also include a mechanism coupling the trigger 108 to the first jaw 124, and the second jaw 126. The trigger 108 is coupled to the jaws 124, 126 through the head 118 to open and close the jaws 124, 126. In addition, adhesive pad 128 is coupled the head 118. The adhesive pad 128 is typically held between the jaws 124, 126. In alternative examples more than two, or a pair, of jaws may be provided. For example constructions utilizing three (tri jaws) or more jaws may be constructed.

The pole 110 may be of any convenient length to allow for a desired reach. An exemplary length may be three feet. Although, shorter or longer lengths may be used for the pole 110. The pole 110 shown is of a fixed length. However, in alternative examples an adjustable length of pole may be used. The material that the pole 110, is made from may be any convenient material. Exemplary materials include steel, plastic, PVC, fiberglass, wood or the like. The pole 110 may be hollow or solid.

The handle 102 is optional. It may be fabricated from rubber, vinyl, a tape wrapping or the like. The trigger 108 may be fabricated from metal or any convenient material in a conventional manner. The trigger 108 may include an optional bail (not shown) for holding the trigger 108 in place. Alternatively, a conventional locking mechanism (not shown) may be provided for holding the trigger 108, in place. The trigger 108 is operatively coupled, by conventional construction to the head 118 to operate the jaws 124, 126. The coupling may be by cable, wire, rod, or any suitable linking structure. Coupling in the example shown is such that the jaws 124, 126 are normally closed. However, in alternative examples the jaws 124, 126 may be normally open. In such case, a bail or locking mechanism (not shown) may be used to keep the jaws 124, 126 shut and the adhesive pad 128 in place.

The adhesive pad 128 may be supported by a platform 138 formed by the jaws 124, 126 that may hold the adhesive pad secure. The adhesive pad 128 typically extends past the jaws on each side 136. This allows the adhesive pad 128 to flex or bend which can aid in the capturing of the insect/arachnid by giving the user better angles of approach when the insect is behind furniture, in corners, or located on the wall above the users shoulder height of approach. Flexing also allows one side of the adhesive pad to be folded over remotely by the user to seal the insect/arachnid in the pad to trap it further and securely, and then dispose of it. Many people who fear insects will have an added sense of security knowing that the insect is enveloped in between two layers of adhesive to which an escape would be extremely improbable.

Figure 2:
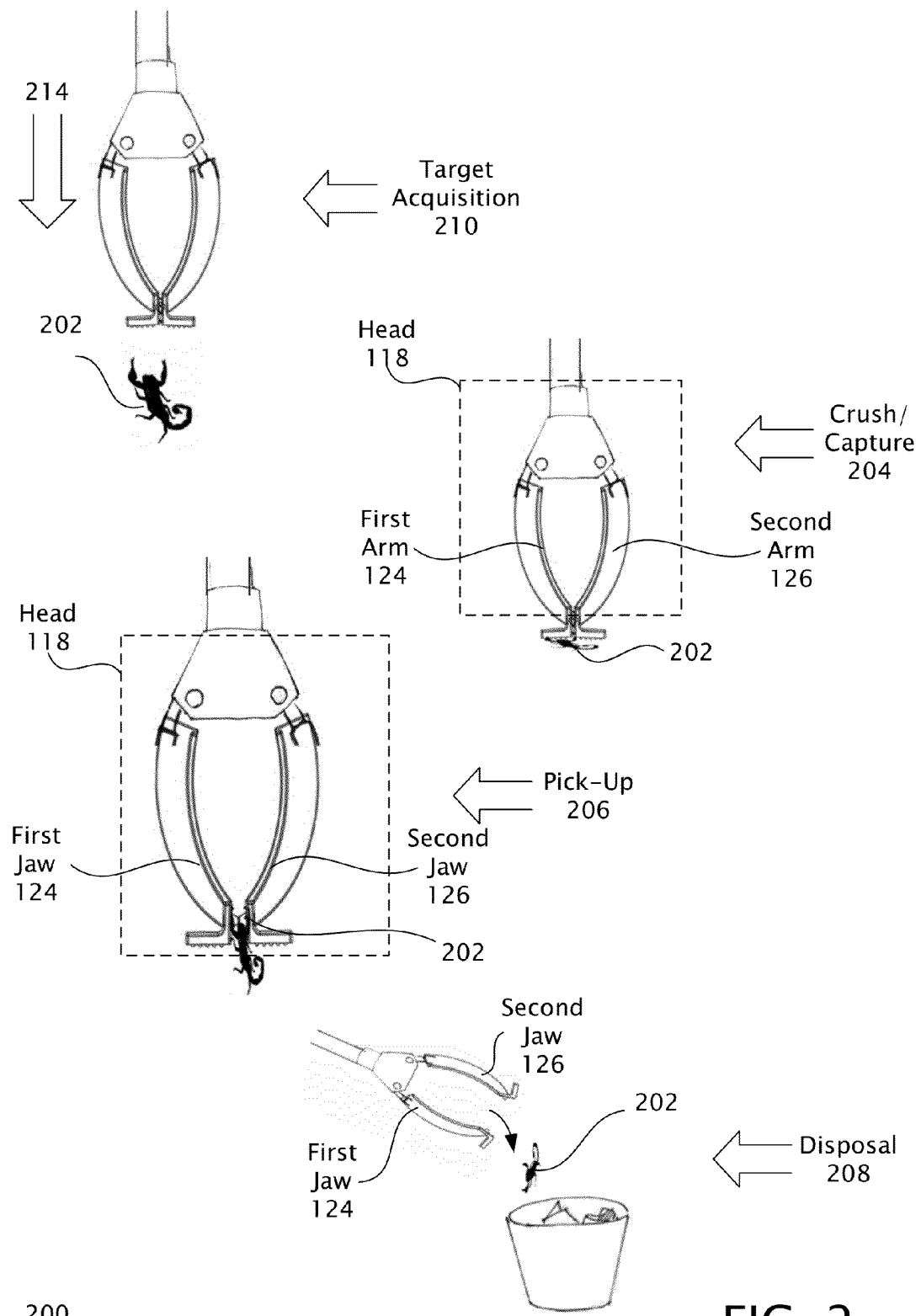
FIG. 2 shows a first method of using the device for capturing insects from a distance with adhesive pads without using any adhesive pads at all but rather relying solely on the unique jaws to perform the function of capturing, incapacitating, and disposing of insects/arachnids and perhaps a rodent.

FIG. 2 shows a first method of using the device for capturing insects from a distance with adhesive pads without using any adhesive pads at all but rather relying solely on the unique jaws to perform the function of capturing, incapacitating, and disposing of insects/arachnids and perhaps a rodent. This example shows how the head 118 of the device for capturing insects from a distance with adhesive pads may be used without an adhesive pad. In this example the capture and disposal of the scorpion 202 is illustrated. However, this method may be applied to any type of insect or arachnid. First, the target is acquired 210. Location of the scorpion 202 may be aided by a black light or other illumination 214 provided by the device for capturing insects from a distance with adhesive pads. A black light may be particularly useful in locating scorpions 202 as they tend to glow when exposed to UV light produced by a black light source (such as a light 130 of FIG. 1). Once the scorpion 202 is found, the head 118 of the device for capturing insects from a distance with adhesive pads is positioned over the scorpion 202.

After approaching the target at 210 the scorpion 202 is then smashed or crushed as shown in view 204. The head 118 of the device for capturing insects from a distance with adhesive pads may be used to crush the scorpion 202 since the first jaw 124 and the second jaw 126 are normally positioned together to form a flat surface suitable for crushing the scorpion 202 at a safe distance.

In view 206 the scorpion is grabbed or picked up the. Once crushed or incapacitated, the scorpion 202 may be picked up by the jaws 124, 126 of the device for capturing insects from a distance with adhesive pads acting as pinchers.

In view 208, the scorpion 202 is disposed of by opening the jaws 124, 126 of the device for capturing insects from a distance with adhesive pads. Operation of the jaws through the entire process may be carried out by the user while keeping distance from the scorpion.

Figure 3:
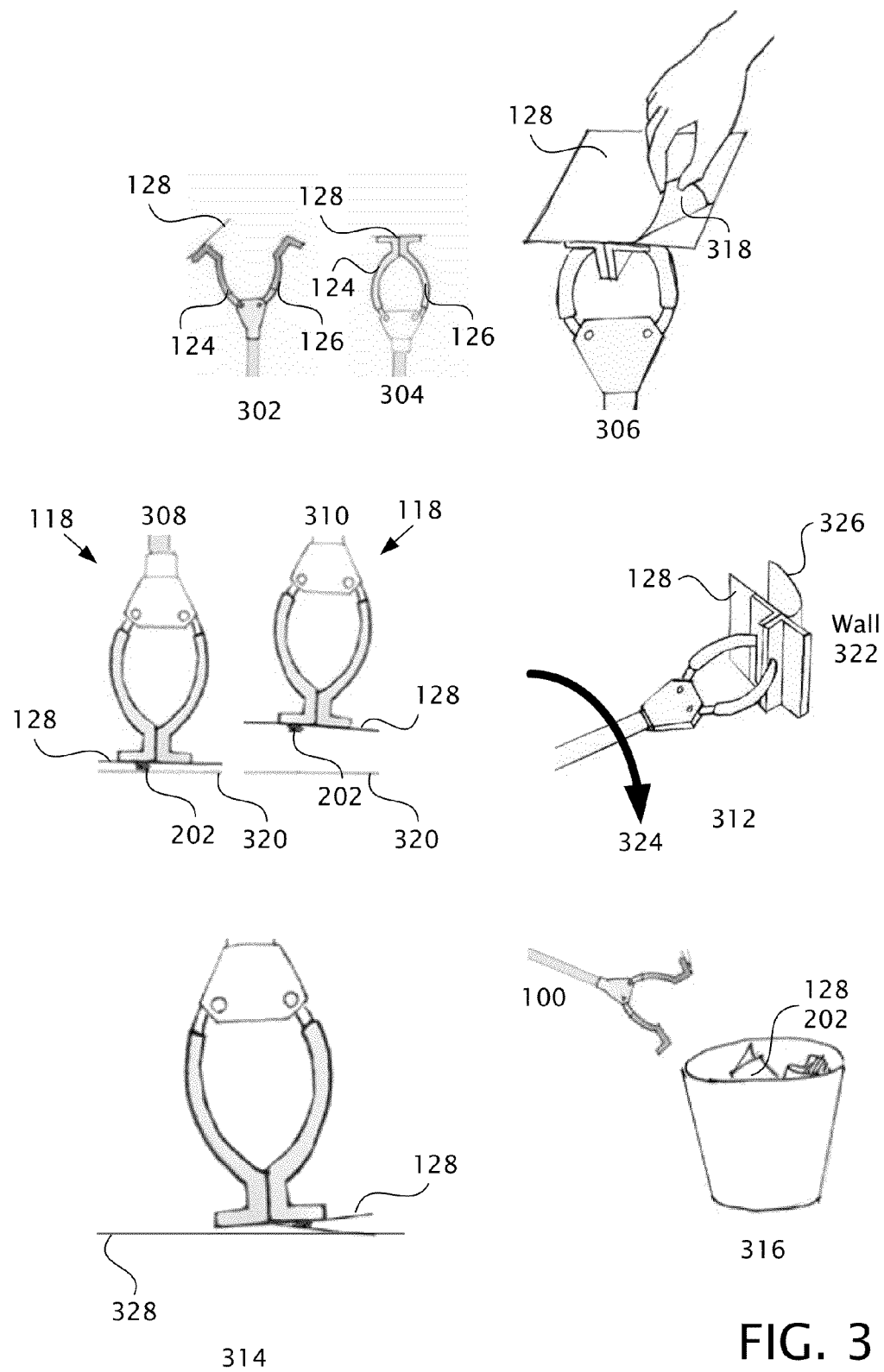
FIG. 3 shows a second method of using the device for capturing insects from a distance with adhesive pads with an adhesive pad.

FIG. 3 shows a second method of using the device for capturing insects from a distance with adhesive pads with an adhesive pad. The adhesive pads function to capture, remove, seal, and dispose of the insect/arachnid between its two adhesive flaps. In view 302 the jaws 124, 126 of the head 118 are opened, and an adhesive sheet 128 is loaded. Next in view 304 the jaws 124, 126 are closed, holding a portion of the adhesive sheet between them. In view 306, once loaded a protective sheet is removed 318 from the adhesive pad 128 to expose the adhesive. At view 308, the head 118 is pushed down against the insect/arachnid 202 crushing it between the adhesive pad 128 and a surface such as a floor, wall or the like 320. At view, 310 the head 118 is removed from the surface 320 with the insect/arachnid 202 stuck to the sticky surface of the adhesive sheet 128.

In view 312 the insect/arachnid is encased in the adhesive sheet 128 by bending one edge 326 of the adhesive sheet 128, against the wall or other surface 322, by the user making a sweeping motion 324. In view, 314 encasing of the insect/arachnid is shown for working with a somewhat horizontal surface 328. The encasing operation is performed as previously described with the adhesive sheet 128 being folded over to capture the insect/arachnid with more of a downward motion to the head. Finally, at view 316 the device for capturing insects from a distance with adhesive pads is moved to a waste container or other suitable receptacle, and the insect/arachnid 202 encased in the adhesive sheet 128 are disposed of.

Figure 4:
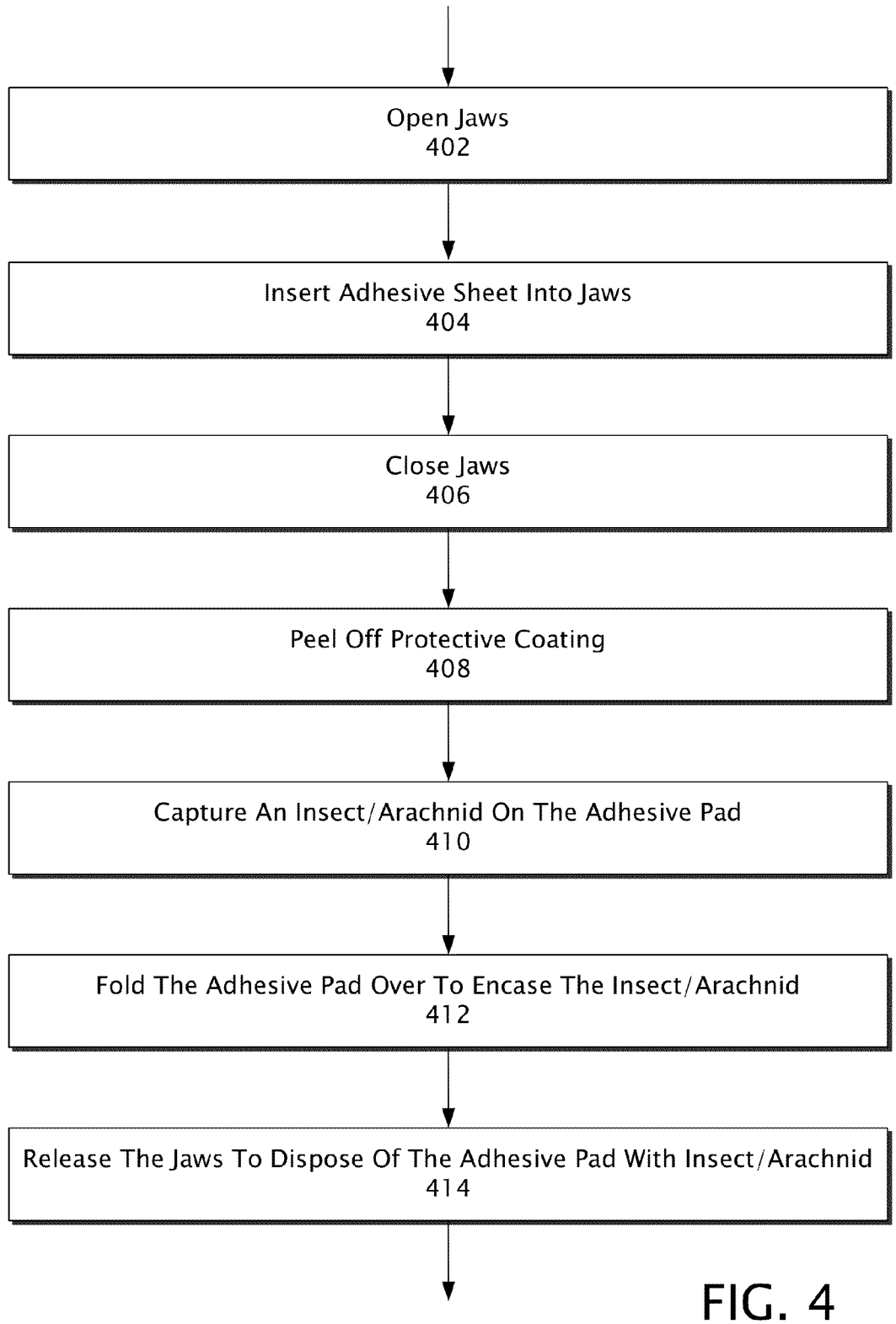
FIG. 4 is a flow chart showing a method of using the device for capturing insects from a distance with adhesive pads.

FIG. 4 is a flow chart showing a method of using the device for capturing insects from a distance with adhesive pads. At block 402, the jaws of the device for capturing insects from a distance with adhesive pads are opened, typically by a user's operation of a trigger device to retract the jaws. At block 404, a portion of the adhesive pad may be inserted between the jaws. Then at block 406, the jaws may be closed to secure a portion of the adhesive sheet between them, so that the sheet is held in the jaws at a distance from the user. At this point, the alignment holes in the sheet may also be aligned with pegs, or cones provided on the jaws to aid retention of the adhesive sheet. The function of the pegs intersecting with the alignment holes in the adhesive pad sheet is to secure the grasp of the adhesive pad to allow the user to remove the pad from the surface of the wall once the adhesive has captured the insect on the wall. It is important to have a secure grasp of the pad at all times until the user is ready for disposal. At disposal, the user needs only to open the jaws, thus releasing the grip on the midsection of the adhesive pad as well as releasing the interlocking peg from the alignment hole to completely release the adhesive pad for proper disposal. The device for capturing insects from a distance with adhesive pads is now loaded with an adhesive sheet, and may be kept in this state as ready for use when an insect/arachnid is found.

At block 408 when the user is ready to capture an insect/arachnid the protective coating is peeled off, or removed, from the adhesive sheet. Peeling back the protective layer exposes the adhesive that may be used to capture the insect/arachnid. At block 410, the insect/arachnid is trapped in the adhesive. Next at block 412, the insect/arachnid is encased in the adhesive sheet, by folding it over on to the trapped insect/arachnid, sealing it in. Finally, at block 414 the jaws of the device for capturing insects from a distance with adhesive pads are released over an appropriate disposal device and the insect/arachnid encased in the piece of sheet fall in the disposal device.

Figure 5:
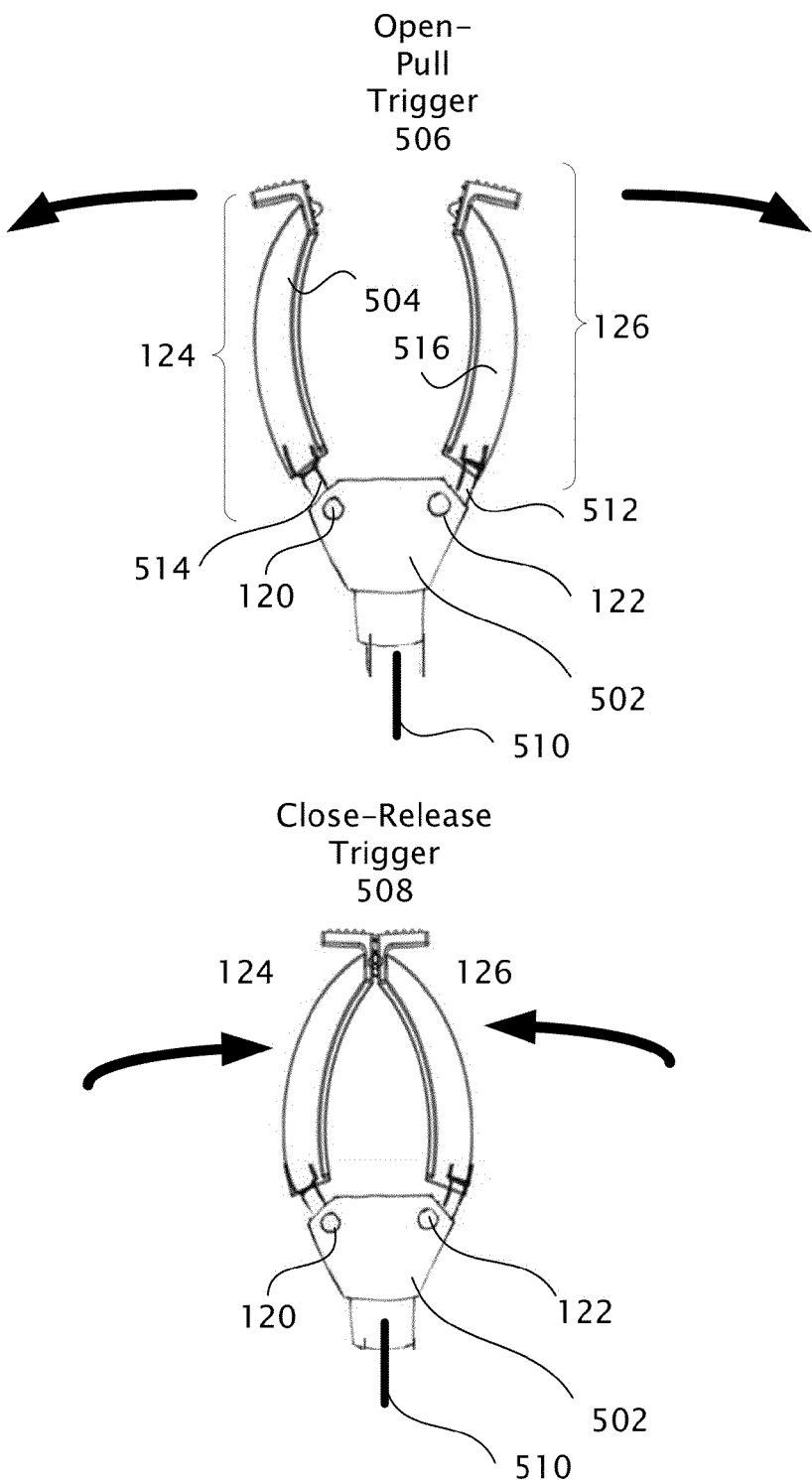
FIG. 5 is a diagram showing the operation of the jaws.

FIG. 5 is a diagram showing the operation of the jaws. As shown at view 506 the jaws 124, 126 are opened by a user operating a trigger that is linked by a cable 510 or other equivalent coupling mechanism to the jaws 124, 126. The coupling mechanism is typically internal to the bracket 502. The mechanism causes supports 512, 514 to move about pivot points 120, 122, in this case further apart from each other into an open position. The supports 512, 514 may have jaw pieces 504, 516 disposed upon them as shown in order to form the jaws 124, 126. Alternatively, support 514 and jaw piece 504 may be fabricated as a single piece to form first jaw 124. Similarly, support 512 and jaw piece 516 may be fabricated as a single piece to form second jaw 126.

In view 508 the trigger (not shown) acting through linkage 510 has been released and the jaws 124, 126 have closed together. Spring bias provided by the mechanism behind bracket 502 may cause the jaws 124, 126 to remain closed with force applied about pivot points 120, 122 bringing the jaws 124, 126 together.

Figure 6:
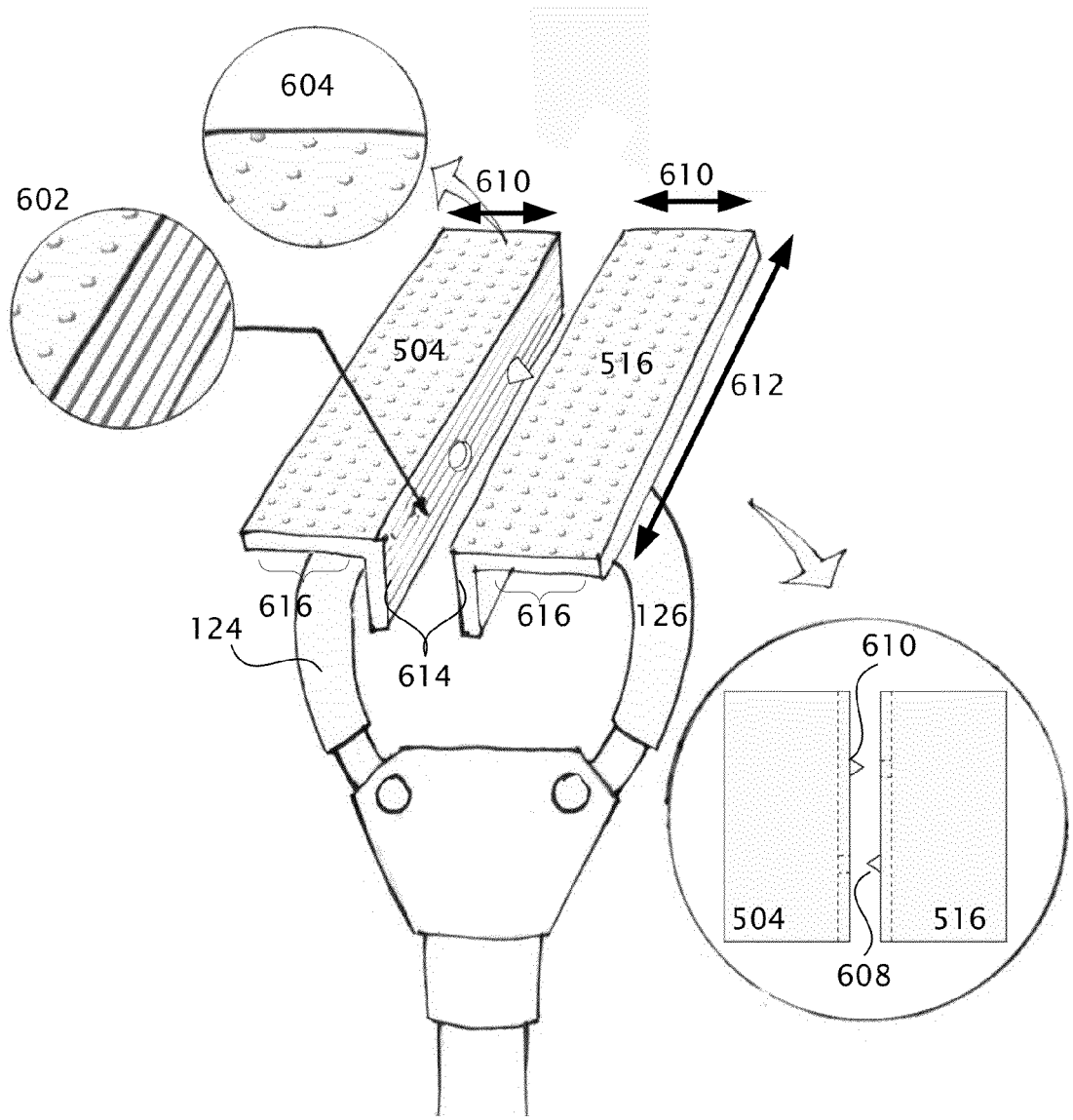
FIG. 6 is a diagram showing further details of the head.

FIG. 6 is a diagram showing further details of the head 118. Jaw pieces 124, 126 have "L" shaped pieces 504, 516 formed onto their ends. First portions 614 of the "L" shaped pieces oppose each other to form a gripping surface for the adhesive sheets (not shown). Second portions 616, of the "L" shaped pieces 504, 516 forms a support surface for a portion of the adhesive sheet that will be installed there.

The support surfaces 616 may each have exemplary dimensions 610, 612 of 1.25 inches and 3.0 inches respectively. Equivalently, other alternative dimensions may be provided. The support surfaces 616 may include bumps 604 to contact with the adhesive sheet (not shown). The adhesive sheet does not stick to this surface when installed as the sticky surface faces the opposite direction, with a backing material facing against the support surface 616.

The gripping surfaces 614 of the "L" shaped pieces may include groves or ridges 602 to help grip a portion of the adhesive sheet inserted between them. The gripping surfaces 616 may also include alignment protrusions including the cones 606, 608 shown. The cones are disposed upon opposite faces but may be equivalently disposed upon the same face. The cones may mate with clearance apertures disposed in the opposite face. Alternatively, other shapes such as pegs, or the like may be used as protrusions for alignment. The alignment cones 606, 608 tend to align the jaws 504, 516 and keep the adhesive sheet (not shown) in place when it is installed.

In further alternative examples, the adhesive sheets may be secured to the device by hook and loop tape, static electricity, magnetic materials, or the like. Any suitable method may be used to couple the adhesive pad to the jaws as long as allowance for the described movement of the adhesive pad is provided for.

Figure 7:
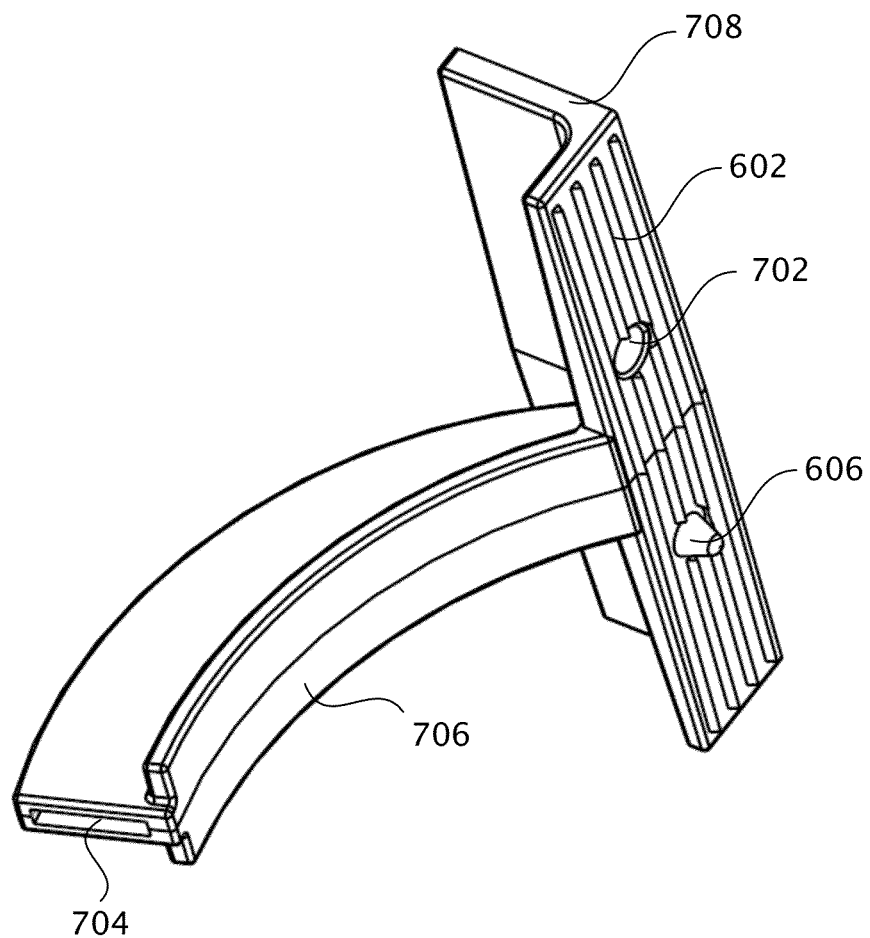
FIG. 7 is a diagram showing further details of a jaw

FIG. 7 is a diagram showing further details of a jaw 504, 516. Here a mounting slot 704 allows for coupling to supports (512, 514 of FIG. 5) by conventional methods such as glue, pins, friction fitting, and the like. An arm-strengthening member 706 is provided for strength and support, and transforms into the "L" shaped head 708, with the rigged gripping surface 602 shown. Also shown are the alignment cone 606 and an aperture, or hole 702. The head 504, 516 may be made of polypropylene or any equivalent material.

Figure 8:
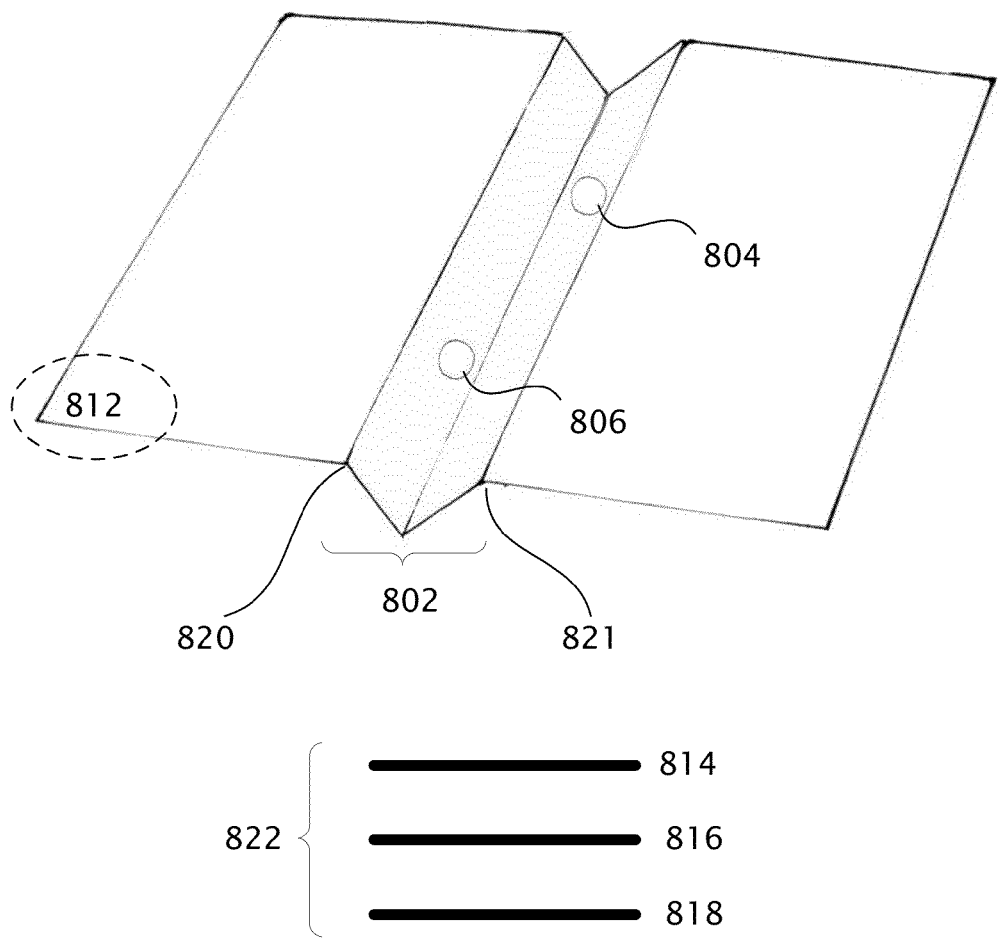
FIG. 8 is a diagram showing further details of the adhesive sheet.

FIG. 8 is a diagram showing further details of the adhesive sheet 128. As shown 822, the adhesive sheet 128 may be constructed in layers 814, 816, 818 from clear or opaque materials. Clear materials allow the insect/arachnid to be seen through the adhesive sheet when it is in use, so that a user can determine if he actually has the insect, and how well it is trapped.

First a conventionally constructed substrate 818 may be provided, which has an adhesive layer 816 disposed upon it. Finally, a removable protective cover 814 may be applied over the adhesive layer to protect it until use. The nature of the adhesive 816, cover 814 and substrate 818 such that when the cover 814 is pealed away the adhesive 816 remains on the substrate 818.

In the example provided the adhesive pad is cut in a rectangular shape, with a "V" shaped fold 802 formed in the middle along the long dimension of the sheet. The folded portion also includes a pair of holes 804, 806 located on opposite sides of the "V" shaped fold that fit onto alignment cones (606, 608 of FIG. 6). On each side of the fold 802 two rectangular areas are provided. An exemplary dimension for each rectangle may be three inches by two inches. This allows an overhang of 0.75 inches of the adhesive pad over the edge of each flat area (504, 516 of FIG. 5) of the jaws. This overhang helps with the folding operation to encase the insect/arachnid into the adhesive sheet as well as allowing the flexing of the pad to give the user more angles of approach to capturing the insect.

After the adhesive pad 128 is installed in the device for capturing insects from a distance with adhesive pads, the cover 814 is typically peeled off to expose the adhesive 816. In alternative examples, a corner or tab 812 may be provided to help the user remove the protective cover 814. The entire cover 814 may be removed from the adhesive pad 128 prior to assembly. Alternatively, the cover 814 may be removed after assembly in two pieces. Scribed 820, 821, or perforated lines 820, 821 may be provided to remove the cover up to the "V" shaped channel 802, where the cover 814 is then torn along the lines 820, 821 provided. Varying degrees of adhesive stickiness and varying degrees of size may be used to capture a larger pest such as a rodent rat or mouse or even to collect trash or pickup and/or retrieve objects.

Figure 9:
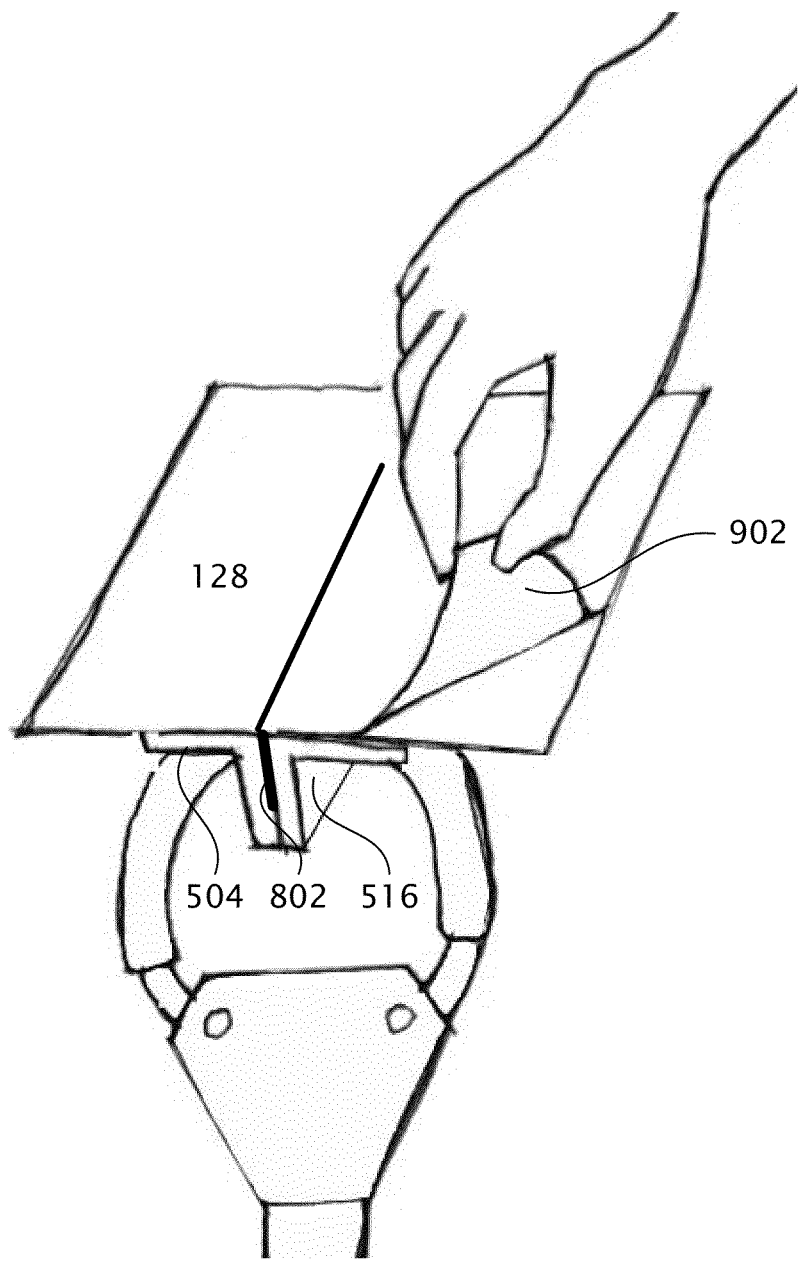
FIG. 9 is a diagram showing the position of the adhesive sheet seated in the jaws, and removal of a protective cover to expose the adhesive surface.

FIG. 9 is a diagram showing the position of the adhesive sheet 128 seated in the jaws 504, 516, with removal of a protective cover to expose the adhesive surface 902. Here the adhesive sheet 128 is shown with the "V" shaped fold 802 mounted between the jaws 504, 516. The user then peels back the corner 902 to expose the adhesive.

Figure 10:
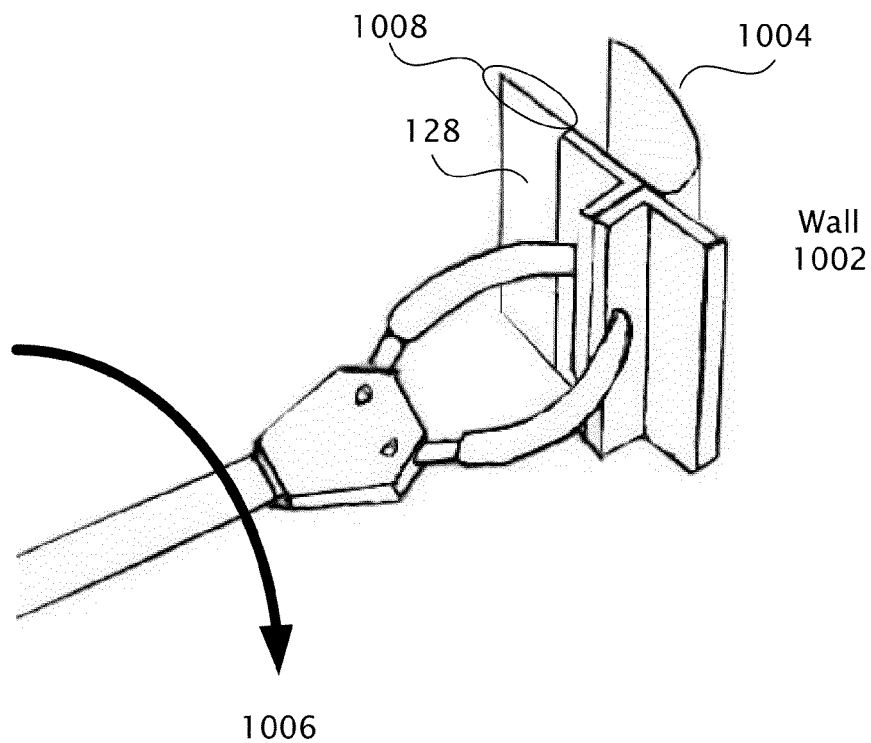
FIG. 10 is a diagram showing the use of the adhesive sheet disposed in the device for capturing insects from a distance with adhesive pads to trap a bug.

FIG. 10 is a diagram showing the use of the adhesive sheet disposed in the device for capturing insects from a distance with adhesive pads to trap a bug. In this example, the insect/arachnid has been caught on the pad 128 and the user is now making motion 1006 to fold the adhesive sheet 128 over the insect/arachnid. There is overlap 1008 of the adhesive sheet, and a user may use the wall 1002 to fold back one side 1004 of the adhesive sheet over the insect/arachnid.

Figure 11:
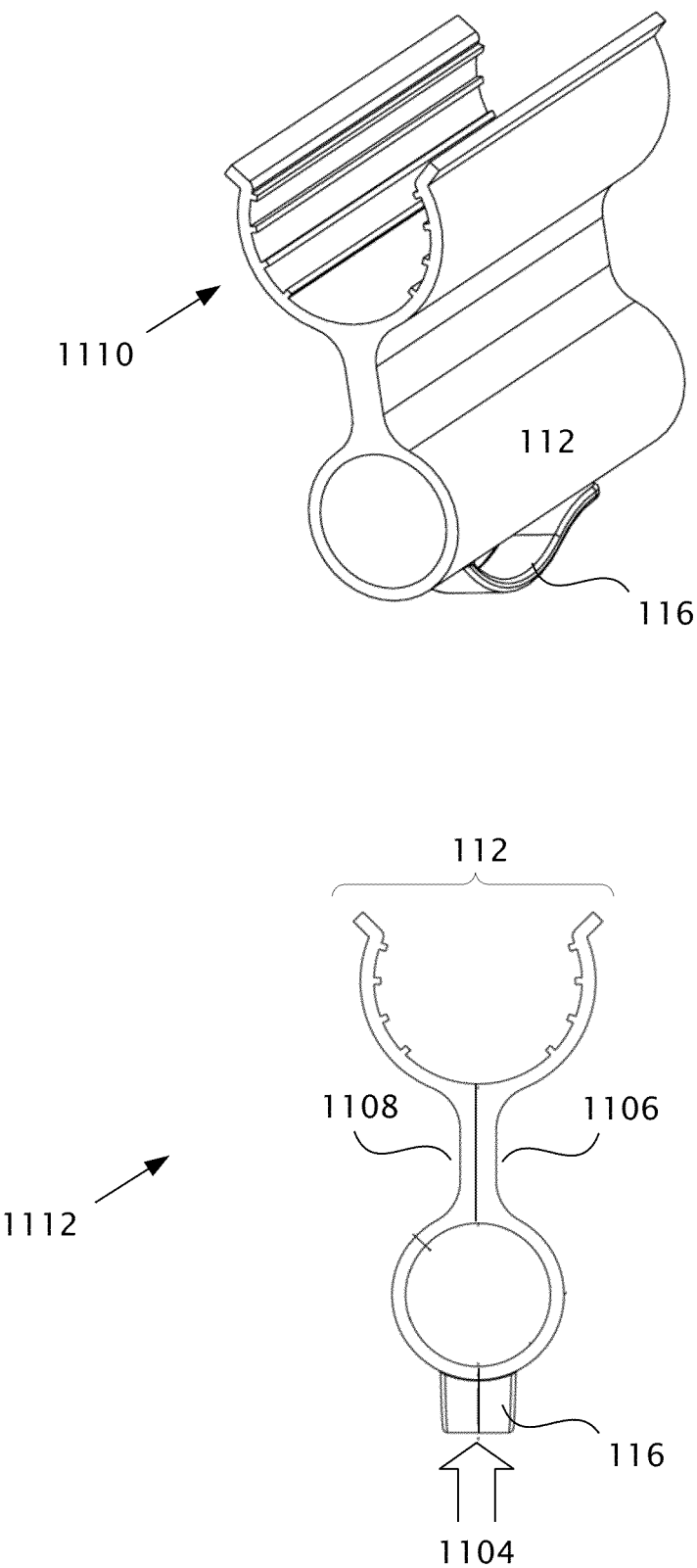
FIG. 11 is shows further detail of the bracket for holding an illumination source and storing adhesive sheets.

FIG. 11 is shows further detail of the bracket 112 for holding an illumination source (130 of FIG. 1), with the aid of ridges 1110 disposed therein. It may also store additional adhesive sheets (128 of FIG. 1) in an integral clip 116. The end view 1112 of the bracket shows a split 1104 along the length of the bracket 112 dividing it into two halves 1106, 1108. The halves can be assembled on the pole by gluing, bolting or other equivalent methods. The bracket 112 may be made, of plastic, nylon or any suitable material. This clip is actually designed as a one piece mold that will be added to the rod shortly after being molded so that when it cools it will shrink to the rod thus adhering to it securely.

Figure 12:
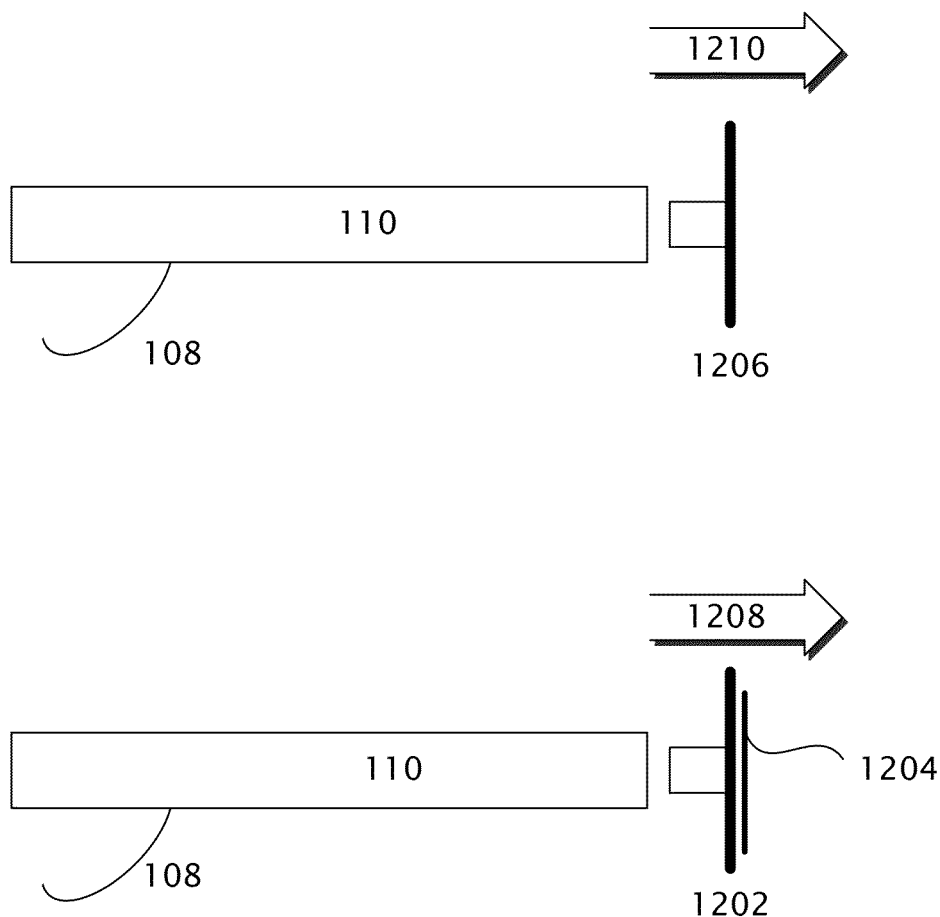
FIG. 12 is a diagram showing alternative examples of the bug stick having disposable and removable heads.

FIG. 12 is a diagram showing alternative examples of the device for capturing insects from a distance with adhesive pads having disposable and removable heads. Here an example having a removable and disposable head 1206 and one having a removable head 1202 with removable sheets 1204 is shown. In both examples, the heads may be loaded by pressing them into the handle or pole 110. When the trigger 108 is pressed the heads 1202, 1206 are ejected 1208, 1210 respectively.

Figure 13:
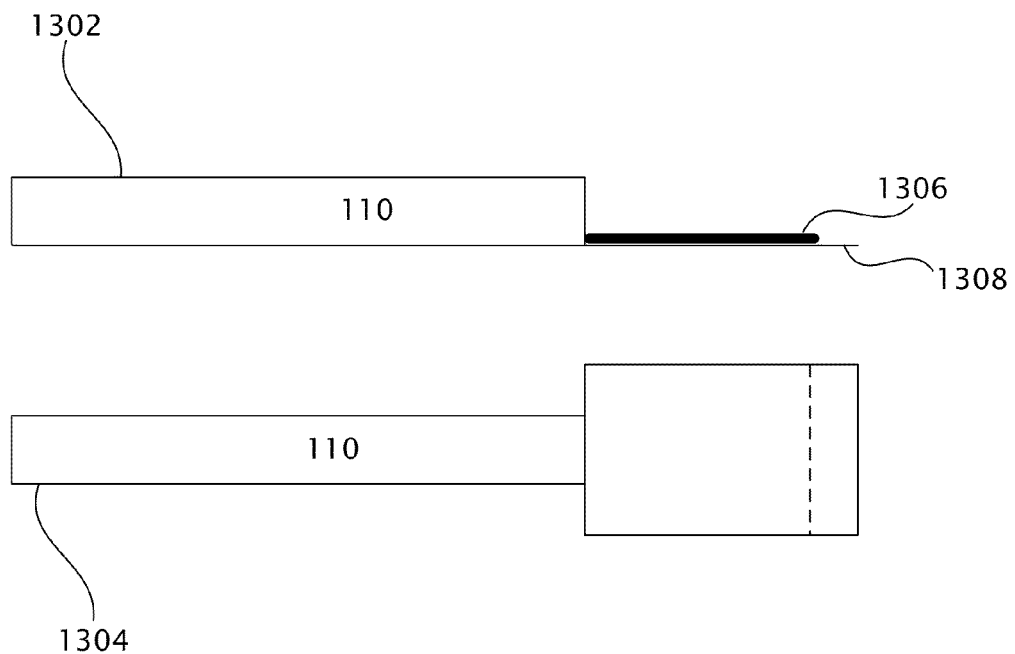
FIG. 13 is a diagram showing an alternative example of the bug stick having a flex-head.

FIG. 13 is a diagram showing an alternative example of the device for capturing insects from a distance with adhesive pads having a flex-head. The side view 1302 shows a pole 110 with a flexible spatula like head 1306 coupled to it. A sheet of adhesive material 1308 may be disposed on the spatula head that is larger than the head and extends past it as shown in bottom view 1304. An insect/arachnid may be caught in the adhesive, and the overhang used to fold the sheet 1308 over the insect and then dispose of it.

Figure 14:
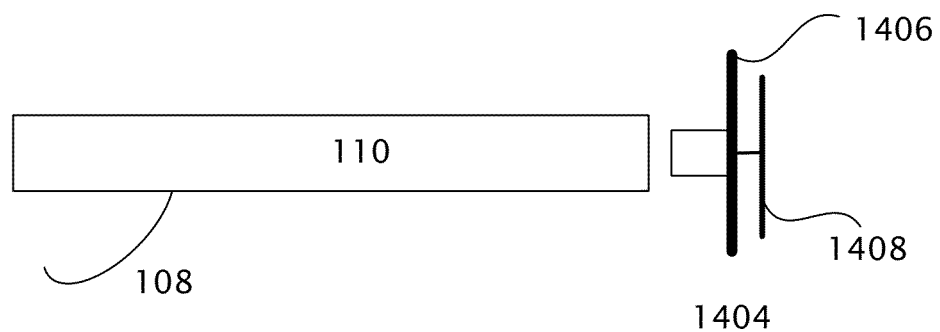
FIG. 14 is a diagram of an alternative example of the bug stick utilizing a pull through method of trapping a bug.
Figure 14:
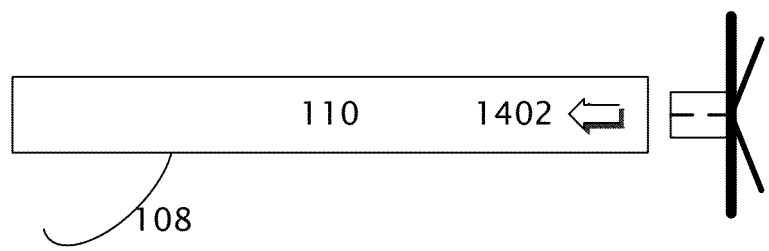

FIG. 14 is a diagram of an alternative example of the device for capturing insects from a distance with adhesive pads utilizing a pull through method of trapping a bug. First an insect/arachnid is trapped against a support surface 1406 an adhesive sheet 1408. A removable head 1404 is coupled to a pole 110, and the action of a trigger is used to pull 1402 a trapped insect through an opening to seal it in an adhesive sheet 1408, and then release the head 1404.

Figure 15:
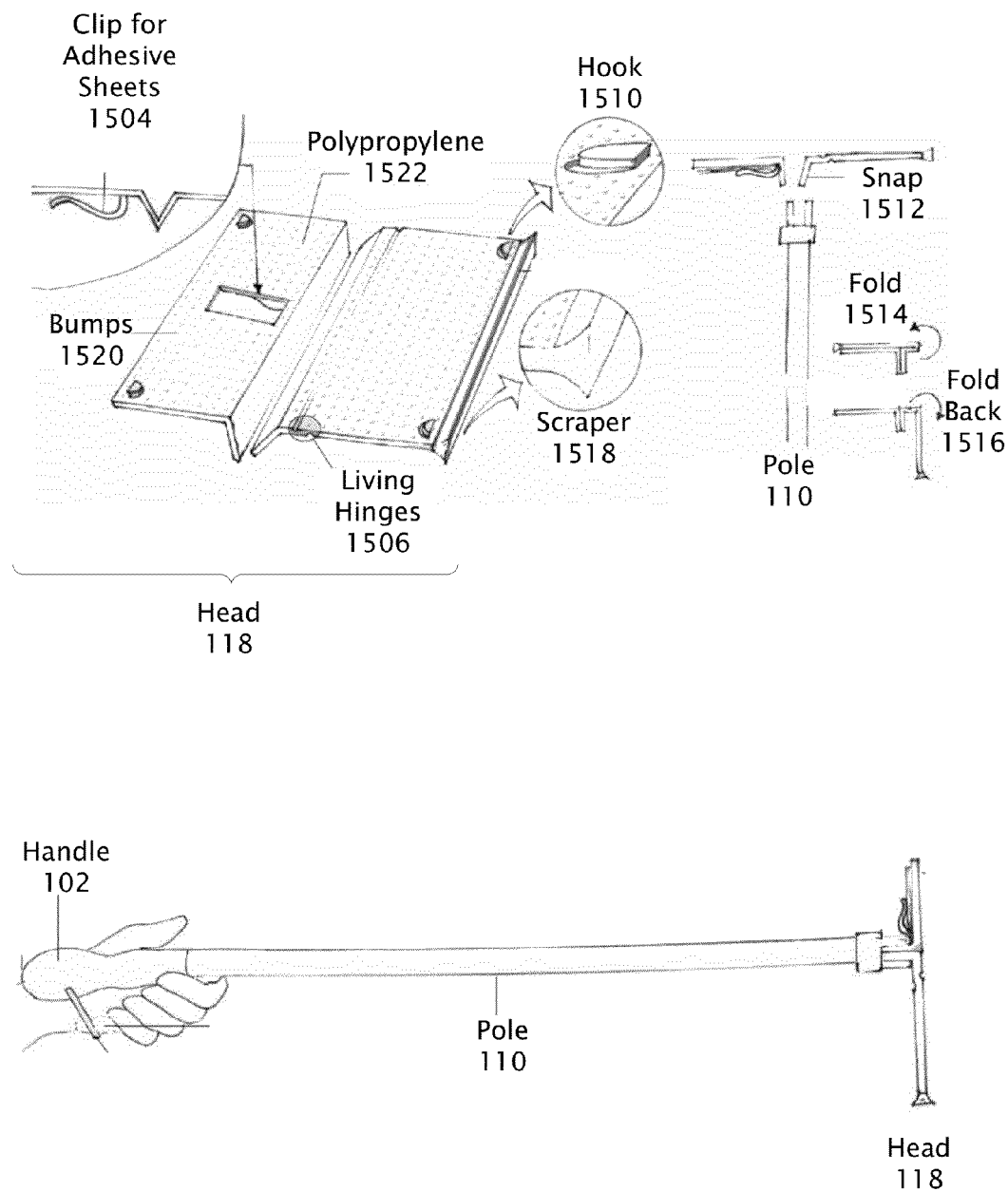
FIG. 15 is a diagram of an alternative example of the bug stick utilizing living hinges.

FIG. 15 is a diagram of an alternative example utilizing living hinges 1506. All common numbered elements are as previously described. The living hinge 1506 is a flexible strip of polypropylene disposed in a head 118 that alloys the head to fold 1514, or to fold back 1516. The head 118 includes a bumpy surface 1520 as previously described, and may be made of polypropylene 1522. The head may also include exemplary hooks 1510 for attaching the adhesive pads (128 of FIG. 1). Also included is a clip 1504 for adhesive sheet (128 of FIG. 1) storage. And finally a scraper 1518 is included as part of the head 118.

The head 118 may snap fit 1512 into the pole 110. When configured in this way the head 118 may fold 1514, and fold back 1515, when in use.

Figure 16:
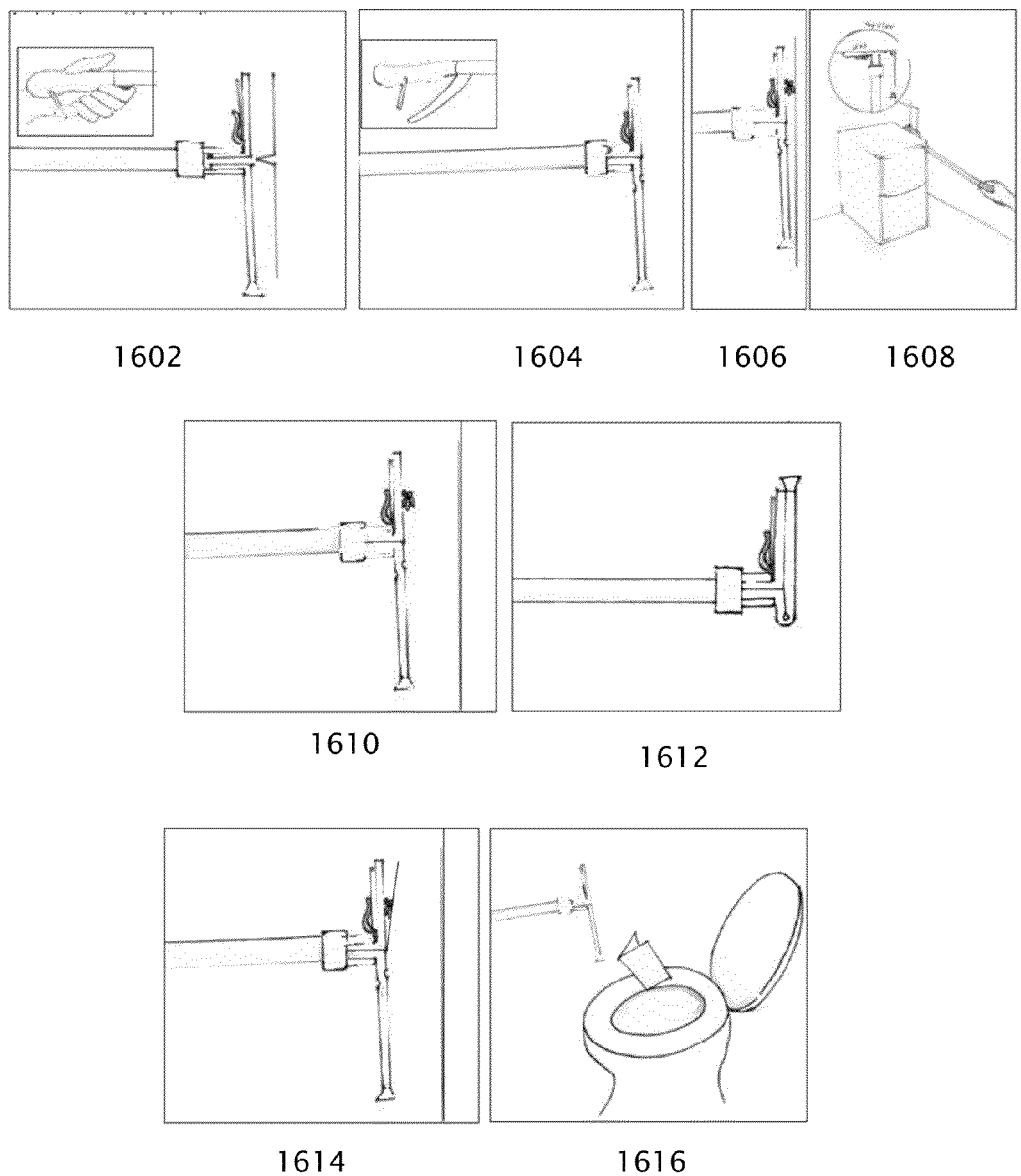
FIG. 16 is a diagram showing a method of using the bug stick having living hinges.

FIG. 16 is a diagram showing a method of using the bug stick having living hinges. At 1602, an adhesive sheet is loaded into the device locked in an open position by securing a bail over the trigger. At 1604, the bail is released locking the adhesive sheet in place. At 1606, the insect/arachnid is captured in a direct approach. At 1606, an insect/arachnid is captured in a corner. In view 1610 a captured insect/arachnid is shown. At 1612, the insect/arachnid is shown enveloped in the adhesive sheet by the action of the head against the adhesive sheet. At 1614, the insect/arachnid is shown enveloped in the adhesive sheet. And finally at 1616, the insect/arachnid is disposed of.

Those skilled in the art will realize that the process sequences described above may be equivalently performed in any order to achieve a desired result. In addition, sub-processes may typically be omitted as desired without taking away from the overall functionality of the processes described above.

The invention claimed is:

1. A device for capturing pests comprising:
a pole having a first end that includes a trigger device allowing remote operation of a head at a second distant end of the pole, whereby a user operating the trigger at the first end is kept away from the head end by substantially a length of the pole, and actuation of the trigger allows an adhesive sheet to be loaded and later disposed of with a pest trapped in the adhesive sheet, without touching the adhesive sheet and the trapped pest;
the head including:
a bracket attached to the second end of the pole, and having a first pivot point and a second pivot point,
a first curved arm having a first end pivotally coupled to the first pivot point, and a second end;
a second curved arm having a first end pivotally coupled to the second pivot point, and a second end;
a first "L" shaped jaw having a first gripping surface including a plurality of cones, and a second support surface at substantially a right angle to the gripping surface, the first gripping surface coupled to the second end of the first curved arm;
a second "L" shaped jaw having a first gripping surface having a plurality of apertures oppositely facing the plurality of cones, and a second support surface at substantially a right angle to the gripping surface, the first gripping surface coupled to the second end of the second curved arm whereby the first support surface of first "L" shaped jaw and the first support surface of the second "L" shaped jaw form a substantially flat rectangular surface of dimensions, length "l" and width "2w" perpendicular to the pole, whereby the trigger is coupled to the jaws through a linkage mechanism and a spring bias provided by a mechanism behind the bracket causes the jaws to remain shut;
the adhesive sheet including:
a rectangular substrate having substantially dimensions of "l" a width greater than "2w", such that when installed in the jaws the width of an installed adhesive sheet is greater than "2w", whereby the adhesive sheet extends past the width of the jaws, having a first side and a second side, wherein the second side is covered with adhesive, and a protective removable cover, and where the adhesive sheet includes a "V" shaped fold along, and parallel to, length "l", and disposed substantially at a center of the adhesive sheet such that the adhesive sheet includes a first sheet area and a second sheet area, whereby the "V" shaped fold is disposed between the jaws and the first sheet area is disposed over the first "L" shaped jaw support surface, and the second sheet area is disposed over the second "L" shaped jaw support surface, and whereby the first sheet area is used to trap the pest, and the second sheet area is remotely folded over the first sheet area with the pest, to seal the pest between the first sheet area and the second sheet area, and whereby the pest sealed between the first sheet area and the second sheet area is disposed of by actuating the trigger device to release the adhesive sheet with the pest from the jaws.

2. The device for capturing pests of claim 1 in which the protective removable cover is scribed whereby the cover may be torn away from the first sheet area and the second sheet area.

3. The device for capturing pests of claim 1 the trigger device allowing remote operation of a head at a second distant end of the pole is coupled to the head by a rod.

4. The device for capturing pests of claim 3 in which the trigger acting through the rod includes spring bias behind the bracket to cause the jaws to remain closed.

* * * * *